Sept. 29, 1959 H. E. ZAHN 2,906,805
ELECTRIC BATTERY
Filed Dec. 19, 1955 2 Sheets-Sheet 1
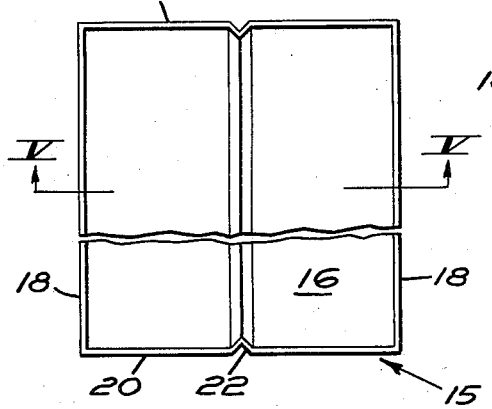
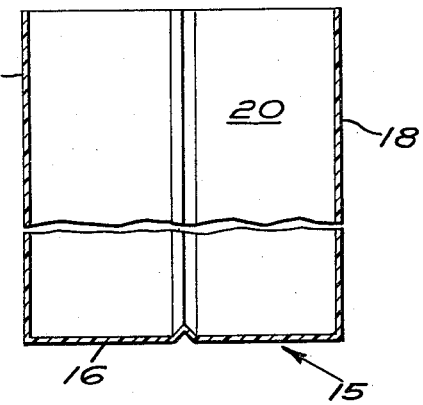
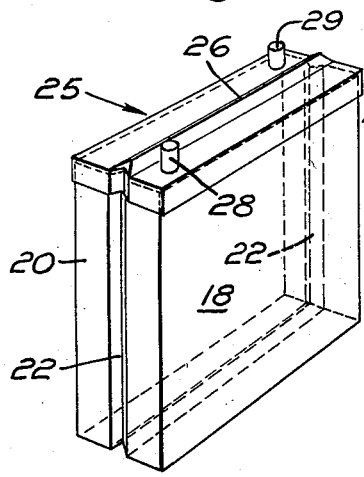
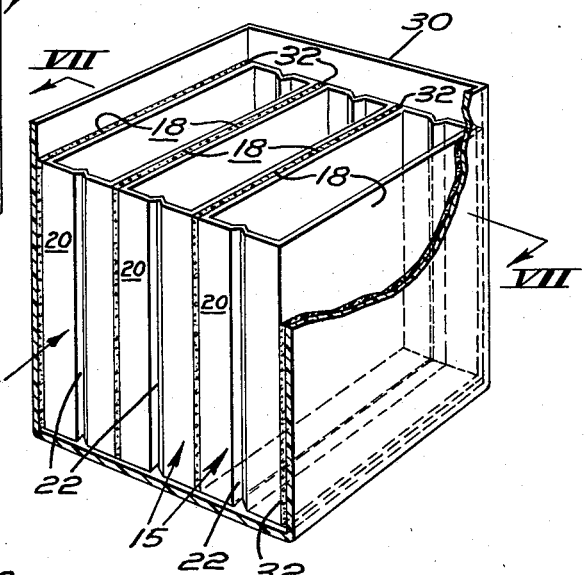
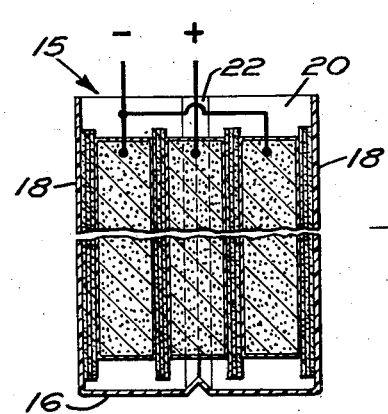
INVENTOR.
HAROLD E. ZAHN
BY
Beau, Brooks, Buckley + Beau,
ATTORNEYS.

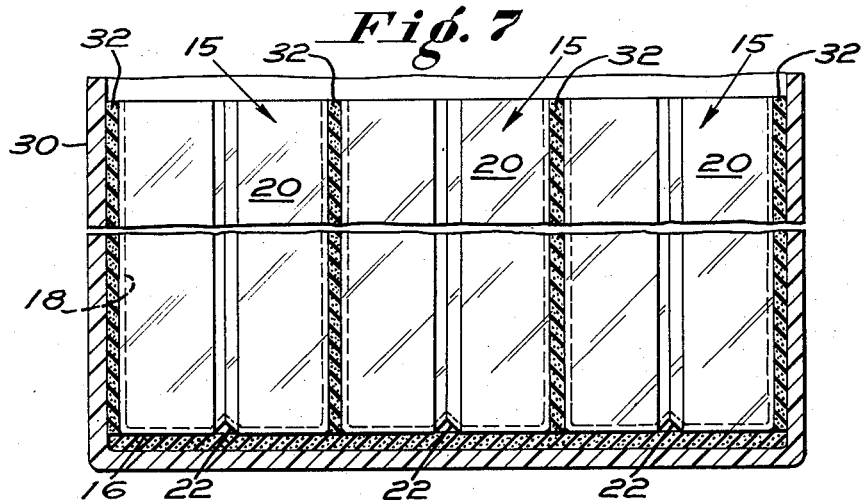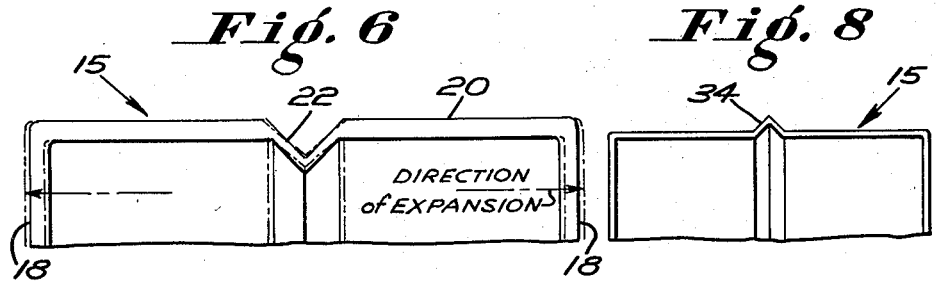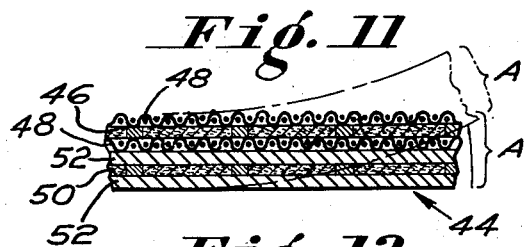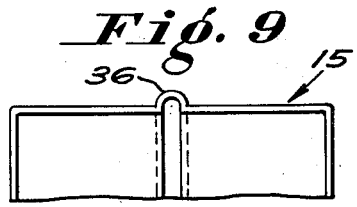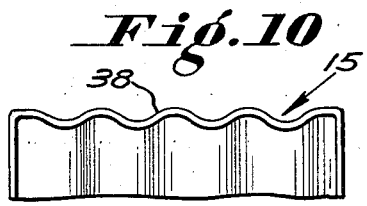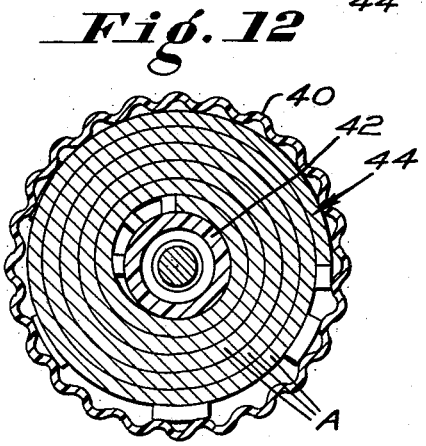

United States Patent Office 2,906,805
Patented Sept. 29, 1959

2,906,805
ELECTRIC BATTERY

Harold E. Zahn, Buffalo, N.Y., assignor to Gould-National Batteries, Inc., St. Paul, Minn.

Application December 19, 1955, Serial No. 553,947

3 Claims. (Cl. 136—170)

This invention relates to electric batteries, and more particularly to an improved form of battery cell casing.

An object of the invention is to provide a battery having an improved cell casing which is operable automatically to maintain at all times upon the battery plate and separator assembly an ideal compression force condition precluding squeezing of electrolyte out of the cell plate assembly; excessive expansion of the plate active material with consequent mechanical disintegration of the plate contents; and/or enlargements of the spaces between the positive and negative plates such as would increase the battery internal resistance.

Another object of the invention is to provide an improved combination battery cell and outer container structure such as is adapted to permit desirable expansion-contraction of the battery plate and separator assemblies, while being at the same time inherently resilient so as to automatically maintain suitable compressive forces thereagainst for optimum battery life and performance.

Other objects and advantages of the invention will appear from the specification hereinafter.

In the drawings:

Fig. 1 is a top perspective view of one form of cell casing embodying the present invention;

Fig. 2 is a sectional view, somewhat diagrammatic, through a battery cell embodying the invention;

Fig. 3 is a fragmentary top perspective view, with portions broken away, of a multi-cell battery construction of the invention;

Fig. 4 is a top plan view of the battery cell casing of Fig. 2;

Fig. 5 is a section taken along line V—V of Fig. 4;

Fig. 6 is a fragmentary plan view of a detail of a cell case construction of the invention;

Fig. 7 is a fragmentary horizontal sectional view taken along line VII—VII of Fig. 3;

Figs. 8, 9, 10 are views corresponding to Fig. 6, but showing modified forms of cell case wall constructions of the invention;

Fig. 11 is a fragmentary sectional view through a special form of battery plate assembly; and Fig. 12 is a horizontal sectional view showing a battery cell case of the present invention adapted to accommodate the battery plate assembly illustrated in Fig. 11.

As stated hereinabove, the invention contemplates provision in a battery of an improved cell casing, the wall portions of which are elastic and so formed and dimensioned as to accommodate alternative expansion-contraction dimensional changes of the positive and negative plate components of the cell, while at all times automatically maintaining thereon an ideal compression force condition. Thus, for example, as illustrated in Figs. 1–7, the invention may be embodied in a battery cell case of generally rectangular form as indicated generally at 15, comprising a one-piece integrally molded open top box-like casing having a bottom wall 16; opposite side walls 18—18, and opposite end walls 20—20. As illustrated in Fig. 2, the positive and negative plates and intermediate separator assemblies of the cell are compression-fitted or firmly stacked in flatwise relation interiorly of the casing 15 and in sidewise attitude relative to the side walls 18—18 of the cell casing.

It is of course well known in the battery art that under service conditions the positive and negative plate assemblies of a battery cell tend to relatively expand and contract incidental to the battery charging and discharging operations thereof and that the separators tend to swell and contract; and that such expansion-contraction displacements in directions normal to the flatwise dispositions of the battery plate assemblies tend to adversely affect the batetry as explained hereinabove. In accord with the present invention, in order to maintain on the plate assemblies a constant pressure in directions normal to the flatwise faces of the plate assemblies the cell casing device is made to be elastic.

Thus, for example, as illustrated in the drawings at Figs. 1–7 the casing may be formed of some electrolyte-resistant semi-rigid material such as is suitable for battery casings, with a pleated section as indicated at 22 extending girthwise of the casing from top to bottom of each end wall section and across the bottom wall portion thereof to give the casing the requisite resiliency characteristics. Such construction of the cell casing permits the latter to expand in directions crosswise of the plane of the pleated section 22, to accommodate expansion forces generated within the battery plate assembly incidental to operation of the battery as explained hereinabove. The invention contemplates that the cell casing member be composed of material such as is inherently elastic, whereby incidental to such expansion of the cell casing, the latter tends at the same time to return to its original dimensional form, thereby maintaining upon the interiorly disposed plate assembly constant compression forces.

Thus, the pleated formation 22 is adapted to alternately open and contract to provide for dimensional elongations and contractions of the cell casing. As illustrated in Fig. 1, the top cover device 25 may also be formed with a transverse pleat as indicated at 26 in alignment with the pleated portion 22 of the cell casing; whereby the entire closed vessel is adapted to dimensionally expand and contract in the directions of the battery plate and separator normal expansion-contraction movements. The cover member 25 may be formed of material similar to that of the casing and suitably cemented or otherwise affixed to the top of the casing 15; and terminal posts as indicated at 28—29 may be provided to extend through the top cover member 25. As shown in Fig. 6, the casing material in the region of the pleated formation 22 may be of reduced wall thickness if preferred, to give it the casing improved flexibility characteristics.

Figs. 3 and 7 illustrate another feature of the invention when employed in conjunction with a multi-cell battery assembly. For example, as shown in Figs. 3 and 7, the invention may be embodied in a three-cell battery wherein individual cells of the type designated 15 are mounted within a single container 30 constructed of any suitable material as is well known in the battery art. To accommodate expansion-contraction movements of the individual cell casings as explained hereinabove, the cells 15 are preferably packed within the container 30 between resilient packing devices, such as sponge rubber pads or sheets as indicated at 32 (Figs. 3, 7). Also, a bottom pad 32 may be employed if desired; and thus the container 30 may be substantially rigid in construction and will at the same time accommodate in firmly packed relation therein the cells 15 while permitting the latter to undergo dimensional changes incidental to operation of the cells while maintaining on the individual plate assemblies thereof constant pressure forces operating to preclude squeezing of electrolyte out of the cell plate assemblies and/or excessive expansion of the plate active materials.

It will of course be appreciated that in lieu of the pleated construction shown in Figs. 1–7, to accomplish the objects of the present invention, the cell casing structure may be of other form such as illustrated for example in Figs. 8–10 to provide the required inherent elasticity characteristics. For example, in Fig. 8 the pleated formation of the cell casing construction is somewhat similar to that of Figs. 1–7 but reversed in direction as indicated at 34. Or, in lieu of an angularly pleated construction as shown in Fig. 9, the cell casing wall may be provided with a rounded convolution as indicated at 36; while as illustrated in Fig. 10, the casing wall may be uniformly convoluted as indicated at 38 throughout substantially the entire extent thereof. In any case, the deviation of the casing side wall from straight wall form obviously provides the structure with elasticity for the purposes of the present invention. It is also to be understood that the invention contemplates that the casing wall structure may be fabricated of inherently resilient material in straight wall form, such as of any suitably elastic natural or synthetic composition, such as is adapted to stretch in response to expansion forces generated within the cell plates, while at the same time maintaining suitable compression forces against the plate assembly for the purposes explained hereinabove.

It is contemplated that the casing structure of the invention may be formed, for example, of natural rubber or plastic compositions or synthetic rubber or plastic materials such as a polystyrene or a polyethylene or the like.

Figs. 11–12 illustrate an application of the invention to another type of battery structure, wherein a battery cell as illustrated in Fig. 12 is in the form of a generally cylindrical casing 40 at the center of which is a cylindrical wall 42; thereby defining therebetween an annular cell into which is packed a coiled plate assembly as indicated generally at 44.

Fig. 11 illustrates the plate assembly 44 in greater detail; and as shown therein it may be fabricated to comprise a positive grid 46 enclosed at its opposite sides by means of insulative woven fabric mats 48—48; and a negative grid as indicated at 50 enclosed between separator plates 52—52. An assembly such as shown in Fig. 11 may be conveniently fabricated in strip or ribbon form, and then coiled upon itself about the central cylindrical post 42 as illustrated in Fig. 12, within the cell device of Fig. 12 to complete the assembly of the battery cell. In any case, the casing portion 40 of the battery cell of Fig. 12 may be formed to provide it with the requisite flexibility as contemplated by the invention, by giving it an occasional "pleated" or "convoluted" form as explained hereinabove, or by constructing it to be of continuously convolutive form as illustrated in Fig. 12, whereby to obtain the elasticity characteristics referred to hereinabove. Thus, during operation of the cell and consequent expansion-contraction of the battery plate assemblies therewith, the casing portion 40 is adapted to expand and contract while maintaining constant compressive forces upon the battery plate assemblies.

Thus, whereas only a few forms of the invention have been shown and illustrated in detail, it will be apparent to those skilled in the art that the invention is not so limited but that various changes may be made therein without departing from the spirit of the invention or the scope of the appended claims.

I claim:

1. A battery cell comprising a casing of substantially rectangular form having opposite end walls and side walls, said casing being formed of flexible elastic material, a battery electrode assembly snugly fitted within said casing, said casing having a pleated portion extending girthwise thereof through said end walls and completely therearound to form relatively narrow strips of said casing angulated from the main wall portions thereof and to each other and to thereby present discrete surface areas of the casing readily deformable as compared with the remaining portions of said casing, and said electrode assembly initially being of a size somewhat larger than the spacing between said side walls so as to cause separation of said side walls and initial deformation of said discrete areas thereof while leaving the remainder of the casing in substantially its normal preformed shape so as to conform to the shape of the electrode assembly while exerting a substantially uniform and constant compressive force thereon.

2. The assembly as defined in and by claim 1 wherein said pleated portion is in the form of an inwardly directed V in said end walls and in the bottom wall of said casing and being in the form of an outwardly directed V in the top wall of said casing.

3. The assembly as defined in and by claim 1 wherein there are a plurality of such cells disposed within a container, there being layers of resilient material interposed between adjacent cells and between the opposed bounding walls of said container and the next adjacent cells.

References Cited in the file of this patent

UNITED STATES PATENTS

| 1,207,293 | Hodge | Dec. 5, 1916 |
| 1,381,608 | Wittmann | June 14, 1921 |
| 1,402,591 | Gallus | Jan. 3, 1922 |
| 1,485,438 | Spoeneman et al. | Mar. 4, 1924 |

FOREIGN PATENTS

| 47,829 | France | July 31, 1937 |
| 114,390 | Great Britain | Apr. 4, 1918 |
| 579,271 | Great Britain | July 30, 1946 |